(12) United States Patent
Ikegami et al.

(10) Patent No.: US 7,037,996 B2
(45) Date of Patent: May 2, 2006

(54) COMPOSITION CONTAINING POLYMER HAVING IONIC FUNCTIONAL GROUP, INK COMPOSITION, AND IMAGE-FORMING METHOD AND IMAGE-FORMING APPARATUS EMPLOYING THE INK COMPOSITION

(75) Inventors: Masayuki Ikegami, Kanagawa (JP); Koichi Sato, Kanagawa (JP); Ikuo Nakazawa, Kanagawa (JP); Sakae Suda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/384,334

(22) Filed: Mar. 6, 2003

(65) Prior Publication Data

US 2003/0171483 A1 Sep. 11, 2003

(30) Foreign Application Priority Data

Mar. 6, 2002 (JP) ............................. 2002-061068

(51) Int. Cl.
*C08F 216/12* (2006.01)
*C08F 16/12* (2006.01)

(52) U.S. Cl. ................. 526/332; 526/333; 526/318; 526/310; 526/387; 526/274; 528/425

(58) Field of Classification Search ............... 528/425; 206/31.13, 31.27; 526/332, 318, 310, 287, 526/279; 523/160, 762
See application file for complete search history.

(56) References Cited

U.S. PATENT DOCUMENTS

| | | | |
|---|---|---|---|
| 5,034,466 A * | 7/1991 | DuBois ...................... 525/247 |
| 5,085,698 A | 2/1992 | Ma et al. ....................... 106/20 |
| 5,139,574 A * | 8/1992 | Winnik et al. ................. 524/84 |
| 5,190,712 A * | 3/1993 | Oishi et al. ............. 264/211.23 |
| 5,519,085 A * | 5/1996 | Ma et al. ..................... 524/503 |
| 5,924,335 A * | 7/1999 | Kuklo ......................... 74/572 |
| 6,391,923 B1* | 5/2002 | Pollmann et al. ........... 514/714 |
| 2002/0049261 A1* | 4/2002 | Soga et al. ................. 523/160 |

FOREIGN PATENT DOCUMENTS

JP 2002-220427 A * 8/2002

OTHER PUBLICATIONS

Aoshima, S.; Hashimoto, K. J. Polym. Chem., A: Polym. Chem. 2001, 38, 746-750.*

* cited by examiner

*Primary Examiner*—David W. Wu
*Assistant Examiner*—Rip A. Lee
(74) *Attorney, Agent, or Firm*—Morgan & Finnegan LLP

(57) ABSTRACT

The present invention provides an ink composition containing a pigment dispersed uniformly in a solvent and a block polymer having an ionic functional group, an image-forming method and an image-forming apparatus employing the ink composition.

The composition comprises a pigment, a solvent and a polymer having an ionic functional group, an acid residue, or a base residue at the terminal. The polymer having an ionic functional group, an acid residue, or a base residue at the terminal is a block polymer of ABX type having A, B, and X segments, wherein A and B are respectively a block segment having a vinyl ether structure as the repeating unit, and X is a terminal segment having an ionic functional group, an acid residue, or an base residue.

1 Claim, 1 Drawing Sheet

FIGURE
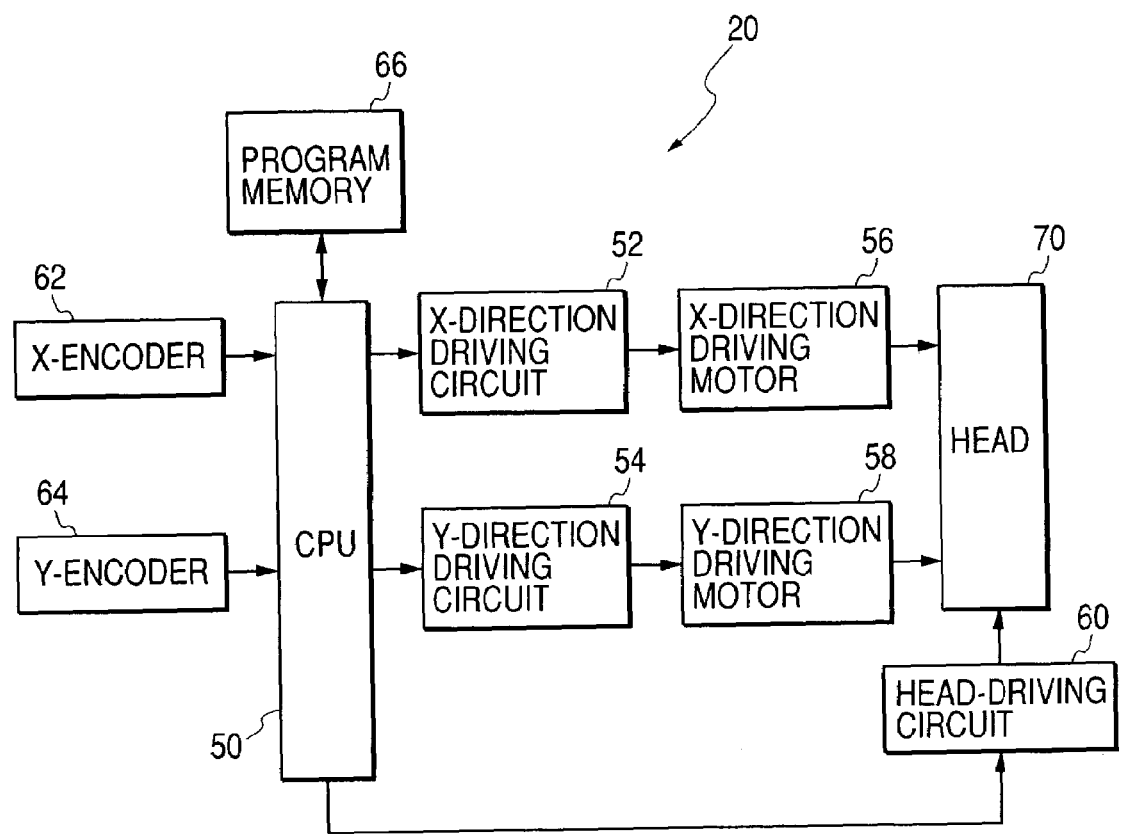

COMPOSITION CONTAINING POLYMER HAVING IONIC FUNCTIONAL GROUP, INK COMPOSITION, AND IMAGE-FORMING METHOD AND IMAGE-FORMING APPARATUS EMPLOYING THE INK COMPOSITION

BACKGROUND OF THE INVENTION

1. Field of the Invention

The present invention relates to a composition containing a particulate substance, a solvent, and a polymer having an ionic functional group. The present invention relates also to an ink composition comprising the above polymer-containing composition, and an image-forming method and an image-forming apparatus employing the ink composition. In particular, the present invention relates to a pigment-dispersion ink composition which comprises water as the solvent and a pigment as the particulate substance; an image-forming composition useful for printers, displays, and the like; and image-forming method and an image forming apparatus employing the pigment-dispersion ink composition.

2. Related Background Art

Various aqueous liquid dispersions are known which contain a particulate solid matter as functional materials, including pesticides such as herbicides, and insecticides; medicines such as anticancer agents, anti-allergy agents, and anti-inflammatory agents; and particulate substances such as coloring materials like inks and toners containing a colorant. In recent years, digital printing techniques are progressing remarkably rapidly. Typical examples of the digital printing techniques are electrophotographic techniques and ink-jet techniques. Such digital printing techniques are becoming more and more important in offices and homes.

Among the digital printing techniques, the ink-jet recording techniques have remarkable advantages of compactness and less power consumption of the apparatus as a direct recording method, contributing improvement of image quality by using finer nozzles. In an example of the ink-jet technique, an ink fed from an ink tank is vaporized into a bubble by heating in a nozzle to be ejected from the nozzle to form an image on a recording medium. In another example, a piezo element is energized to eject an ink through a nozzle.

In these methods, since the ink employed is usually an aqueous dye solution, the ink can run on superposition of colors, or the ink can feather in the fiber direction of the paper in the recorded area of the recording medium. For prevention thereof, use of a pigment-dispersion ink is investigated (U.S. Pat. No. 5,085,698). However, many problems are still remaining unsolved.

The present invention has been made to solve the above problems in the prior art techniques. The present invention intends to provide a composition containing a particulate substance dispersed in a solvent and a block polymer having an ionic functional group.

The present invention intends also to provide an ink composition containing a pigment as the particulate substance, water as the solvent, in which the pigment is dispersed with high dispersibility.

The present invention intends further to provide a pigment-dispersion ink composition for ink-jet recording, which contains a particulate pigment material dispersed with high dispersion stability in the solvent, and which forms an image with high fixability and high smearing resistance.

The present invention intends still further to provide an image-forming method employing the above pigment-dispersion ink composition for ink-jet recording, and an image-forming apparatus for the image-forming method.

SUMMARY OF THE INVENTION

A first embodiment of the present invention is a composition containing a polymer having an ionic functional group, which contains a particulate substance, a solvent, and a polymer which has an ionic functional group, an acid residue, or a base residue at the terminal.

The composition of the present invention contains preferably a particulate substance, a solvent, and a block polymer which has an ionic functional group, an acid residue, or a base residue at the terminal.

The polymer having an ionic functional group, an acid residue, or a base residue at the terminal is preferably a block polymer containing segments of A, B, and X, where A and B are respectively a block segment having a vinyl ether structure as the repeating unit, and X is a terminal segment having an ionic functional group, an acid residue, or an base residue.

The block segment A is preferably constituted of the repeating unit represented by General Formula (1):

(in the formula, $R_1$ is selected from the group consisting of linear and branched alkyl groups of 1–18 carbons, -Ph, -Pyr, -Ph-Ph, -Ph-Pyr, $-(CH(R_5)-CH(R_6)-O)_p-R_7$, and $-(CH_2)_m-(O)_n-R_7$; the hydrogen atom in the aromatic ring may be substituted by a linear or branched alkyl group of 1–4 carbons; and the carbon atom in the aromatic ring may be substituted respectively by a nitrogen atom;

p is an integer of 1 to 18, m is an integer of 1 to 36, n is 0 or 1;

$R_5$ and $R_6$ are independently —H or —$CH_3$;

$R_7$ is selected from the group consisting of Hydrogen, linear and branched alkyl groups comprising 1 to 18 carbons, -Ph, -Pyr, -Ph-Ph, -Ph-Pyr, —CHO, —$CH_2$CHO, —CO—CH=$CH_2$, —CO—C($CH_3$)=$CH_2$, —$CH_2$COO$R_8$, and when $R_7$ is other than a hydrogen atom, the hydrogen atom bonding to a carbon atom in $R_7$ may be substituted by a substituent selected from the group consisting of a linear or branched alkyl group of 1–4 carbons, —F, —Cl and —Br, and the carbon atom in the aromatic ring may be substituted respectively by a nitrogen atom;

$R_8$ is H or an alkyl of 1–5 carbons;

Ph represents phenyl, and Pyr represents pyridyl).

The block segment B is preferably constituted of the repeating unit represented by General Formula (2):

(in the formula, R2 is selected from the group consisting of -Pyr, —(CH(R$_5$)—CH(R$_6$)—O)$_p$—R$_7$ and —(CH$_2$)$_m$—(O)$_n$—R$_7$; p, m, n, R$_5$, R$_6$ and R$_7$ are the same as those defined above).

The ionic functional group, acid residue, or base residue of the terminal segment X is preferably selected from carboxylic acid, sulfonic acid, phosphoric acid, and metal salts thereof, amines, acid salts of amines.

The terminal segment X is preferably the segment represented by General Formula (3):

General Formula (3):

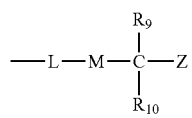
(3)

wherein L is a coupling group for coupling with the terminal of a block polymer selected from the group consisting of a single bond, —O—, —COO—, —OCO—, —CONH— and —NHCO—; M is a substituted or unsubstituted linear or branched alkylene group of 1–30 carbons; R9 and R10 are independently selected from the group consisting of a hydrogen atom, an alkyl group, COOR$_{11}$ and NR$_{12}$R$_{13}$; R$_{11}$ represents a substituent selected from the group consisting of a hydrogen atom, an alkyl group, and a counter ion group of a carboxy anion and R12 and R13 represent independently a substituent selected from the group consisting of a hydrogen atom and alkyl group; Z represents a substituent selected from the group consisting of —COOH, a carboxylic ester group, —COO$^-$, —SO$_3$H, a sulfonic ester group, —SO$_3^-$, —OPO$_3$H$_2$, phosphoric ester group, —OPO$_3$H$^-$, —OPO$_3^{2-}$, an amino group and an acid salt of an amino group.

The aforementioned particulate substance is preferably a pigment.

The aforementioned solvent is preferably water.

The aforementioned block polymer is preferably responsive to stimulation to change the properties thereof.

The stimulation is preferably any of temperature change, exposure to electromagnetic wave, pH change, and concentration change.

A second embodiment of the present invention is an ink composition comprising the above composition.

The ink composition is preferably an ink-jet ink composition.

A third embodiment of the present invention is an image-forming method employing the above ink composition.

In the image-forming method for recording an image by ejecting an ink from an ink ejection unit onto a recording medium, the ink is preferably the aforementioned ink composition.

The image is formed from the ink composition and fixed on a recording medium preferably by contact of the ink composition with a stimulating substance which gives stimulation to the ink composition.

The stimulating substance which gives the aforementioned stimulation is preferably provided preliminarily on the recording medium.

The ejection of the ink from the ink ejection unit is preferably conducted by action of thermal energy to the ink.

A fourth embodiment of the present invention is an image-forming apparatus employing the above image-forming method.

A fifth embodiment of the present invention is a recording medium for the aforementioned image-forming method in which the ink composition is ejected from the ink-ejection unit onto the recording medium, wherein a stimulating substance for stimulating the ink composition is preliminarily provided on the recording medium.

A sixth embodiment of the present invention is a block polymer containing segments of A, B, and Y, where A and B are block segments as defined above having a vinyl ether structure as the repeating unit, and Y is a terminal segment represented by General Formula (4):

General Formula (4)

-L'-M'-Z' (4)

(in the formula, L' is a coupling group for coupling with the terminal of a block polymer selected from the group consisting of a single bond, —O—, —COO—, —OCO—, —CONH— and —NHCO—; M' is a substituted or unsubstituted linear or branched alkylene group of 2–30 carbons; and Z' represents a substituent selected from the group consisting of —COOH, a carboxylic ester group, —COO$^-$, —SO$_3$H, a sulfonic ester group, —SO$_3^-$, —OPO$_3$H$_2$, a phosphoric ester group, —OPO$_3$H$^-$, —OPO$_3^{2-}$, an amino group, and an acid salt of an amino group).

The feature of the present invention is further described below.

In the present invention, the particulate substance is a pigment. The solvent is preferably water, although any of water, aqueous solvents, and organic solvents may be used as the solvent. The use of water as the solvent is one feature of the present invention.

With the composition of the present invention responsive to stimulation, sufficient fixation can be achieved by stimulating the composition in the process of image formation to cause increase of ink viscosity or a like change. The stimulation is selected from temperature change, exposure to electromagnetic wave, pH change, and temperature change suitably for the image formation: two or more kinds of stimulation may be combinedly employed.

The composition of the present invention is useful as the ink for ink-jet recording.

The present invention covers an image-forming method employing the aforementioned composition, including an image-forming method for recording by ejecting an ink from an ink ejection unit onto a recording medium.

For using the aforementioned stimulation-responsive composition, the image-forming method of the present invention employs a means for giving stimulation. For example, the image is fixed on a recording medium by contact of the stimulation-responsive ink composition with a stimulating substance.

The stimulating substance may be an ink composition different from the ink composition of the present invention.

The stimulating substance may be provided preliminarily on the recording medium.

The image-forming methods of recording an image by ejecting an ink composition from an ink-ejecting unit onto a recording medium include ejection of an ink by action of a thermal energy to an ink composition, and ejection of an ink by use of a piezo element.

A further embodiment of the present invention is an image-forming apparatus employing the aforementioned image-forming method.

A further embodiment of the present invention is a recording medium onto which a stimulating substance capable of stimulating the stimulation-responsive composition is provided preliminarily.

BRIEF DESCRIPTION OF THE DRAWINGS

FIGURE shows schematically the system of an image-forming apparatus of the present invention.

DETAILED DESCRIPTION OF THE PREFERRED EMBODIMENTS

The inventors of the present invention completed the present invention as the results of comprehensive investigation on the prior art techniques and the disadvantages thereof.

The composition containing a polymer having an ionic functional group (hereinafter simply referred to as a "polymer-containing composition") of the present invention comprises a particulate substance, a solvent, and a polymer having an ionic functional group, an acid residue, or a base residue at the terminal.

The polymer having an acid residue or a base residue at the terminal contained in the polymer-containing composition of the present invention is preferably a block polymer.

In particular, the block polymer in the present invention having an ionic functional group, an acid residue, or a base residue at the terminal is preferably a block polymer containing segments of A, B, and X, where A and B are block segments having a vinyl ether structure as the repeating unit, and X is a terminal segment having an ionic functional group, an acid residue, or a base residue.

The polymer-containing composition of the present invention contains the particulate substance having the intended function and being dispersed uniformly owing to the presence of the aforementioned block polymer. Further the polymer-containing composition of the present invention is a functional material responsive to stimulation.

Typical examples of the composition of the present invention include compositions for pesticides such as herbicides and insecticides; compositions for medicines such as anti-cancer agents, anti-allergy agents, and anti-inflammatory agents; compositions for cosmetics such as lipsticks, foundation make-ups, cheek colorants and moisture-retaining creams; and compositions used as colorants of color inks and toners.

The particulate substance in the present invention means a compound or material having a desired function contained in the polymer-containing composition of the present invention. For example, the particulate substance includes active compounds having a herbicidal activity or active compounds having an insecticidal activity of the pesticides; compounds of medical compositions for mitigating an objective symptom; and effective components of cosmetics such as a compound exhibiting moisture-retaining effects of moisture-retaining creams; and particulate solid substance such as pigments and dyes of colorants.

The preferred particulate substance in the present invention may be a pigment, a metal, a herbicide, an insecticides, a biological material, and a medicine to be suitable for the use of the polymer-containing composition of the present invention.

The particulate substance is contained in the polymer-containing composition in the range of 0.1 to 50 mass %, preferably 1 to 30 mass % based on the total weight of the composition.

The solvent contained in the polymer-containing composition of the present invention is a medium capable of dissolving, suspending, or dispersing the components contained in the composition, without special limitation. The solvent in the present invention includes organic solvents such as linear, branched, and cyclic aliphatic hydrocarbons, aromatic hydrocarbons, and heterocyclic hydrocarbons; aqueous solvents; and water. Water and aqueous solvents are used suitably in the present invention.

The aqueous solvent includes polyhydric alcohols such as ethylene glycol, diethylene glycol, triethylene glycol, polyethylene glycol, propylene glycol, polypropylene glycol, and glycerin; polyhydric alcohol ethers such as ethylene glycol monomethyl ether, ethylene glycol monoethy ether, ethylene glycol monobutyl ether, diethylene glycol monoethyl ether, and diethylene glycol monobutyl ether; and nitrogen-containing solvents such as N-methyl-2-pyrrolidone, substituted pyrrolidones, and triethanolamine. In use for an ink, monohydric alcohols such as methanol, ethanol, and isopropyl alcohol may be employed to facilitate drying on the paper sheet.

The block polymer contained in the polymer-containing composition of the present invention has an ionic functional group, acid residue, or base residue at the terminal. Specifically, the block polymer contains segments of A, B, and X. The segments A and B have a repeating unit of a vinyl ether structure, and the segment X is a terminal segment having an ionic functional group, acid residue, or base residue.

The block polymer in the present invention is composed of the segments A, B, and X. The terminal segment X should be situated at the terminal, but combination of the segments A and B is not limited. For example, the combination may be ABX, BAX, ABAX, BABX, AABX, ABBX, or the like. Such a block polymer of the present invention is hereinafter referred to as an ABX type block polymer.

The block segment of the block polymer in the present invention may be a copolymer or a graduation polymer.

The ABX type block copolymer used in the present invention can be synthesized specifically by a living polymerization process, a group transfer polymerization process, or a macro-chain transfer process. The living polymerization includes anion polymerization, cation polymerization, and radical polymerization. In the synthesis of the block polymer, the ABX block polymer can be synthesized by firstly polymerizing a monomer for the A segment, additionally polymerizing another monomer for the B segment to form an AB block polymer, and finally introducing the X component capable of bonding to the polymerization terminal to form the ABX block polymer. The block polymer can be synthesized similarly by group transfer polymerization, or macro-chain transfer polymerization. In the present invention, preferably a cation living polymerization process is employed. Aoshima's process is well known for the cation living polymerization (e.g., Journal of Polymer Science, Part A, Polymer Chemistry, vol. 39, p. 746, 2001). The useful monomer includes vinyl ether type monomers, and styrene type monomers. The useful initiator includes protonic acids such as hydrochloric acid, sulfuric acid, methanesulfonic acid, trifluoroacetic acid, trifluoromethanesulfonic acid, and perchloric acid; combination of a Lewis acid such as $BF_3$, $AlCl_3$, $TiCl_4$, $SnCl_4$, $FeCl_3$, $RAlCl_2$, and $R_{1.5}AlCl_{1.5}$ with a cation source (the cation source including protonic acids, water, alcohols, and adducts of a vinyl ether and a carboxylic acid). The initiator is used for the polymerization of monomers in the presence preferably of a Lewis base such as ethyl acetate and tetrahydrofuran capable of stabilizing the carbocation.

The block polymer constituting the polymer-containing composition of the present invention keeps most of the properties of the block segments or the repeating unit structure of the respective block segments to exhibit the properties of the both kinds of segments. In particular, the block segments or the unit moieties responsive to stimulation will function effectively and efficiently in comparison with random copolymers.

The ABX type block polymer used in the present invention has preferably a hydrophilic segment and a hydrophobic segment. At least one of the block segments, the hydrophilic block, can respond to the stimulation (for example, changes hydrophilicity to hydrophobicity) to change the property of the composition, or the hydrophobic block segment in a certain conditions can respond to the stimulation to become hydrophilic to change the properties of the composition.

A preferred example of the stimulation-responsiveness of the block copolymers is the ABX type block polymer contained in the polymer-containing composition of the present invention in which at least one kind of the block segments is responsive to the stimulation. In such a composition, under certain conditions, the polymer is dispersed in a micelle state in the solvent with the stimulation-responsive block segments kept hydrophobic to exhibit a low viscosity: on receiving stimulation, the stimulation-responsive block segment of the polymer becomes hydrophilic, and the polymer changes its state from the low viscosity dispersion state to a highly viscous polymer solution state. In such a manner, the polymer-containing composition changes its state in response to stimulation.

In the present invention, as described above, excellent stimulation-responsiveness can be obtained by using water as the solvent. Whereas the above explanation is made by taking the ABX type block polymers only, the block polymer is not limited to the ABX type, but may be of an ABDX type, or an ADBX type, or of a random structure of the A and B block segments containing other repeating units, provided that the property of the polymer-containing composition of the present invention changes on receiving the stimulation. The constituting block segment may have a structure of a graft polymer or a graduation polymer. In the above description, the symbol D denotes a block segment other than the segments A and B.

In the structure of the ABX type block polymer in the present invention, the vinyl ether structure of the repeating unit of the A block segment has preferably the structure represented by the above General Formula (1), but is not limited thereto. The structure may be combination of two or more kinds of the vinyl ether structures.

In the structure of the ABX type block polymer in the present invention, the vinyl ether structure of the repeating unit of the B block segment has preferably the structure represented by the above General Formula (2). The structure may be combination of two or more kinds of the vinyl ether structures.

The terminal segment X of the ABX type block polymer of the present invention is preferably the segment represented by the above General Formula (3).

In this Patent Specification, -Ph denotes a phenyl group; -Pyr, a pyridyl group; -Ph-Ph, a biphenylyl group; and -Ph-Pyr, a pyridylphenyl. The groups of pyridyl, biphenylyl and pyridyldiphenyl may be any of the possible positional isomers.

The present invention provides also a polymer compound of a novel block polymer.

The polymer compound of the present invention is a block polymer containing segments of A, B, and Y, where A and B are block segments as defined above having a vinyl ether structure as the repeating unit, and Y is a terminal segment represented by the above General Formula (4).

The block polymer in this invention is composed of the segments A, B, and Y. The terminal segment Y should be situated at the terminal, but combination of the segments A and B is not limited. Such a block polymer of this invention is hereinafter referred to as an ABY type block polymer.

Examples of the repeating units contained in the block segments A and B of the block polymer of the present invention are shown below without limiting the structure employed in the present invention.

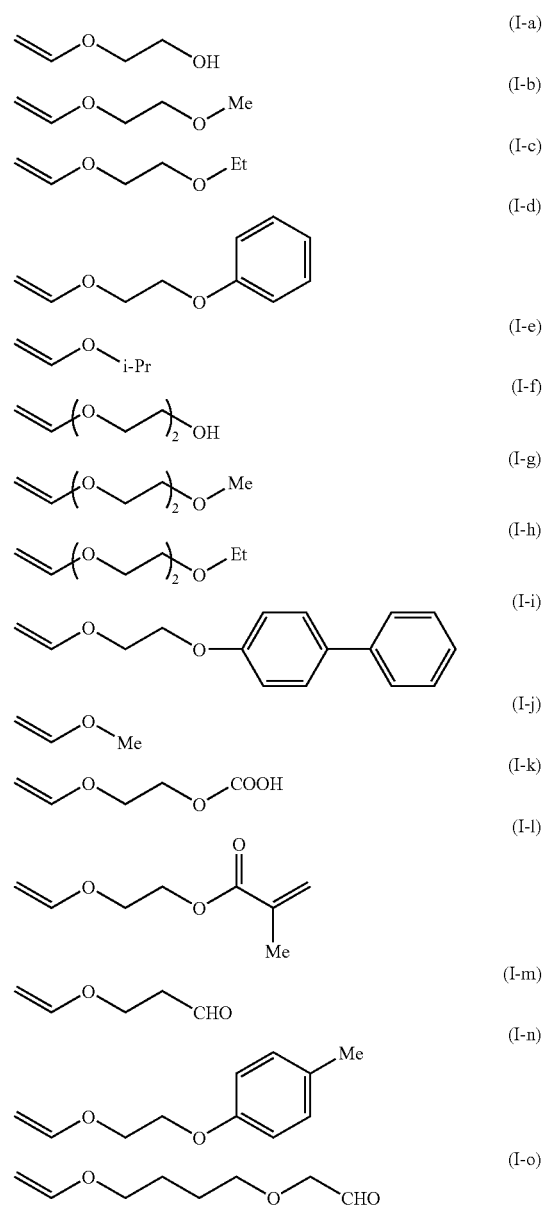

In the formulas, Me denotes methyl; Et, ethyl; and i-Pr, isopropyl.

Examples are shown below of the structures of the block polymers having the vinyl ether structure without limiting the polymer of the present invention.

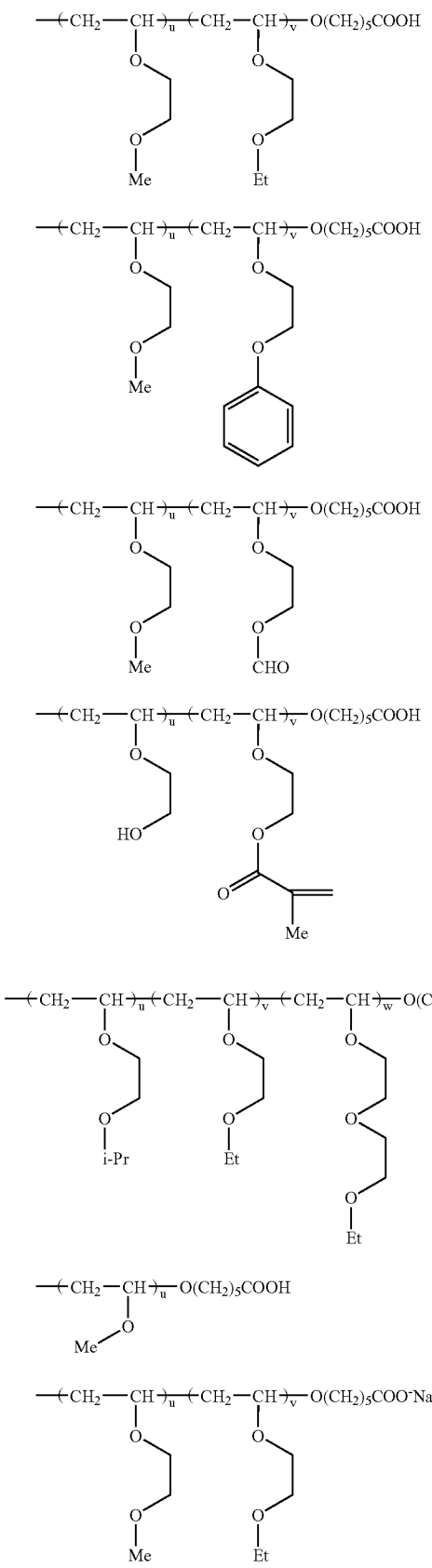
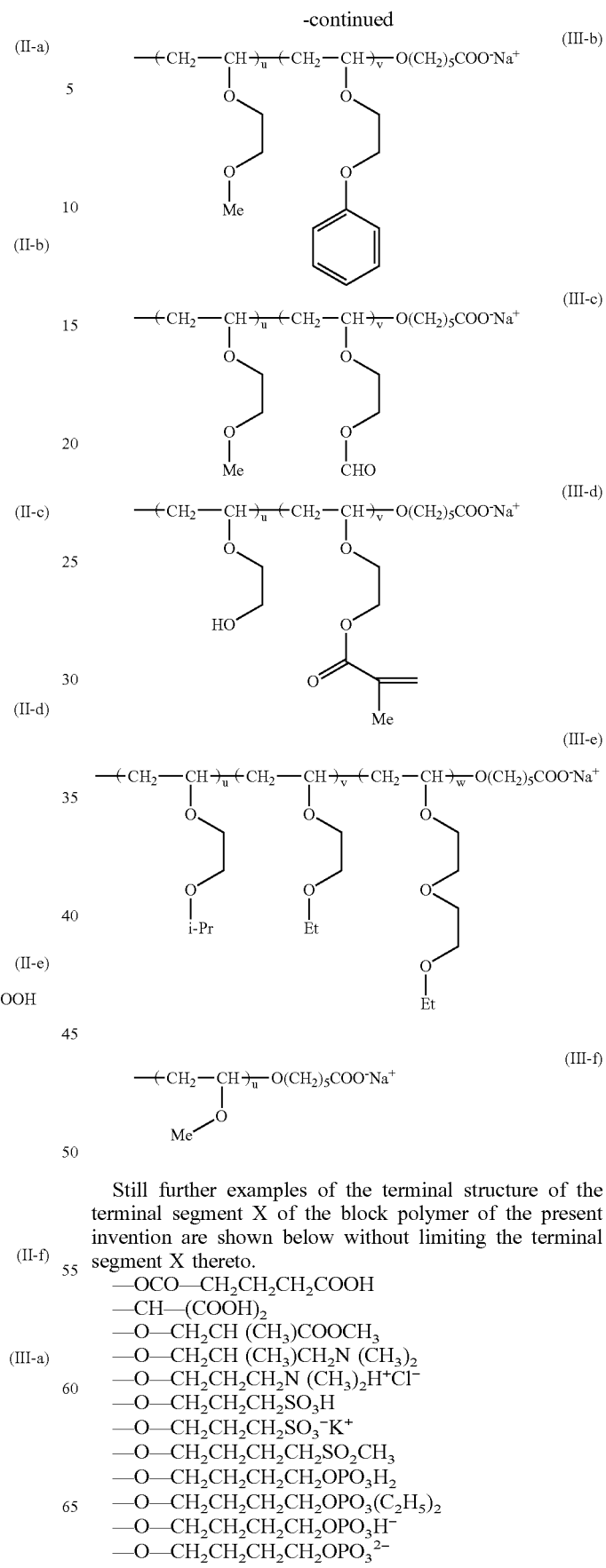

Still further examples of the terminal structure of the terminal segment X of the block polymer of the present invention are shown below without limiting the terminal segment X thereto.

—OCO—CH$_2$CH$_2$CH$_2$COOH
—CH—(COOH)$_2$
—O—CH$_2$CH (CH$_3$)COOCH$_3$
—O—CH$_2$CH (CH$_3$)CH$_2$N (CH$_3$)$_2$
—O—CH$_2$CH$_2$CH$_2$N (CH$_3$)$_2$H$^+$Cl$^-$
—O—CH$_2$CH$_2$CH$_2$SO$_3$H
—O—CH$_2$CH$_2$CH$_2$SO$_3$$^-$K$^+$
—O—CH$_2$CH$_2$CH$_2$CH$_2$SO$_2$CH$_3$
—O—CH$_2$CH$_2$CH$_2$CH$_2$OPO$_3$H$_2$
—O—CH$_2$CH$_2$CH$_2$CH$_2$OPO$_3$(C$_2$H$_5$)$_2$
—O—CH$_2$CH$_2$CH$_2$CH$_2$OPO$_3$H$^-$
—O—CH$_2$CH$_2$CH$_2$CH$_2$OPO$_3$$^{2-}$

In the above polyvinyl ethers, the numbers u, v, and w of the repeating units are independently in the range preferably from 1 to 10,000, and more preferably the total (u+v+w) is in the range from 10 to 20,000.

The number-average molecular weights of the block polymer and the high molecular compound of the present invention range from 500 to 2,000,000, preferably from 1,000 to 500,000. The polymer of the molecular weight of less than 500 tends to result in insufficient dispersing power, whereas the polymer of the molecular weight of higher than 2,000,000 tends to give an excessively high viscosity.

The content of the block polymer in the polymer-containing composition of the present invention ranges preferably from 0.1 to 50 mass %. At the content of less than 0.1 mass % of the block polymer, the dispersibility of the particulate substance in the composition of the present invention tend to be insufficient, whereas at the content of more than 50 mass %, the viscosity tends to be excessively high. More preferably the content is in the range from 0.5 to 30 mass %.

The polymer-containing composition of the present invention changes its state (properties) in response to stimulation. For example, the change of the state includes a phase change between a sol state and a gel state, a phase change between a solution state and a solid state, and change of chemical structure. The stimulation in the present invention includes a temperature change; electric field application; exposure to light (electromagnetic wave) such as ultraviolet ray, visible light, and infrared light; change of pH of the composition; addition of a chemical substance; and concentration change of the composition.

The stimulation-responsiveness in the present invention means the capability of changing a property of the composition in response to the above stimulation. In other words, the stimulation-responsiveness means the quality of changing significantly the shape or property of the composition on application of stimulation such as exposure to electromagnetic wave, application of an electric field, change of temperature, addition of a chemical substance, and change of the concentration of the composition. The stimulation in the present invention may be combination of two of more kinds of stimulation, and the property to be changed is selected to meet the purpose of use of the composition.

For medical uses, the change may be release of a functional substance by changing the chemical structure on application of the stimulation. For cosmetic uses, the change may be a change of the phase state of the composition on application of the stimulation to prevent volatilization of a desired functional substance. For colorant uses, the change may be a phase change (for example, change from sol to gel) on contact with a recording medium by stimulation to prevent ink-running or feathering or to improve the fixability onto the recording medium.

The polymer-containing composition of the present invention is useful, as described above, in various application fields such as pesticides, medicines, cosmetics, and coloring materials, being particularly useful as an ink material containing a pigment or a dye and water or a solvent for dissolution. The ink material can be improved in various properties including fixability by use of the polymer-containing composition of the present invention as an ink composition.

In the ink composition which is a preferred embodiment of the polymer-containing composition of the present invention, the particulate substance is usually a pigment. Specific examples of the pigment useful for the ink composition employing the polymer-containing composition of the present invention are shown below.

The pigment may be either an organic pigment or an inorganic pigment. A black pigment and three primary-color pigments of cyan, magenta, and yellow are used as the ink pigments. Another color pigment, a colorless or a pale color pigment other than the aforementioned pigments, or a metallic luster pigment, or the like may be used. Either a commercial pigment or a newly synthesized pigment may be used. A dye may be used in combination with the above pigment.

Examples of commercial pigments of black, cyan, magenta, and yellow are shown below.

The black pigment includes Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000, ULTRA II, Raven 1190, and ULTRA II (the above pigments produced by Columbian Carbon Co.); Black Pearls L, MOGUL-L, Regal 400R, Regal 660R, Regal 330R, Monarch 800, Monarch 880, Monarch 900, Monarch 1000, Monarch 1300, and Monarch 1400 (the above pigments produced by Cabot Co.); Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, and Printex 140V (the above pigments produced by Degussa Co.); No.25, No.33, No.40, No.47, No.52, No.900, No.2300, MCF-88, MA 600, MA 7, MA 8, and Ma 100 (the above pigments produced by Mitsubishi Chemical Co.); but is not limited thereto.

The cyan pigment includes C.I.Pigment Blue-1, C.I.Pigment Blue-2, C.I.Pigment Blue-3. C.I.Pigment Blue-15, C.I.Pigment Blue-15:2, C.I.Pigment Blue-15:3, C.I.Pigment Blue 15:4, C.I.Pigment Blue-16, C.I.Pigment Blue-22, and C.I.Pigment Blue-60; but is not limited thereto.

The magenta pigment includes C.I.Pigment Red-5, C.I.Pigment Red-7, C.I.Pigment Red-12, C.I.Pigment Red-48, C.I.Pigment Red-48:1, C.I.Pigment Red-57, C.I.Pigment Red-112, C.I.Pigment Red-122, C.I.Pigment Red-123, C.I.Pigment Red-146, C.I.Pigment Red-168, C.I.Pigment Red-184, C.I.Pigment Red-202, and C.I.Pigment Red-207; but is not limited thereto.

The yellow pigment includes C.I.Pigment Yellow-12, C.I.Pigment Yellow-13, C.I.Pigment Yellow-14, C.I.Pigment Yellow-16, C.I.Pigment Yellow-17, C.I.Pigment Yellow-74, C.I.Pigment Yellow-83, C.I.Pigment Yellow-93, C.I.Pigment Yellow-95, C.I.Pigment Yellow-97, C.I.Pigment Yellow-98, C.I.Pigment Yellow-114, C.I.Pigment Yellow-128, C.I.Pigment Yellow-129, C.I.Pigment Yellow-151, and C.I.Pigment Yellow-154; but is not limited thereto.

A self-water-dispersible pigment is also useful for the ink composition of the present invention. The water-dispersible pigment includes the ones having a polymer adsorbed thereon utilizing a steric hindrance effect, and the ones utilizing electrostatic repulsion. Examples of commercial products are CAB-O-JET 200, and CAB-O-JET 300 (produced by Cabot Co.); Microjet Black CW-1 (produced by Orient Chemical Co.); and so forth.

The pigment for the ink composition of the present invention is used in an amount preferably of 0.1 to 50 mass % based on the weight of the ink composition. At a pigment content of lower than 0.1 mass %, sufficient image density cannot be obtained, whereas at a pigment content of higher than 50 mass %, the pigment can aggregate to become non-dispersible. More preferably the pigment content is in the range of 0.5 to 30 mass %.

The useful solvent includes water, aqueous solvents, and organic solvents. Of these solvents, water is preferred. The water is preferably deionized water free from metal ions, pure water, or ultra-pure water.

The water is contained in the ink composition at a content preferably of 5 to 99 mass %, more preferably 10 to 90 mass %. At the water content of lower than 5 mass %, the colorant dispersion can be insufficient, whereas at the water content higher than 99 mass %, the function or performance of the other component tends to be insufficient.

The aqueous solvent includes polyhydric alcohols such as ethylene glycol, diethylene glycol, triethylene glycol, polyethylene glycol, propylene glycol, polypropylene glycol, and glycerin; polyhydric alcohol ethers such as ethylene glycol monomethyl ether, ethylene glycol monoethy ether, ethylene glycol monobutyl ether, diethylene glycol monoethyl ether, and diethylene glycol monobutyl ether; and nitrogen-containing solvents such as N-methyl-2-pyrrolidone, substituted pyrrolidone, and triethanolamine. In use for an ink, monohydric alcohols such as methanol, ethanol, and isopropyl alcohol may be employed to facilitate drying on the paper sheet (a recording medium).

The aqueous solvent is contained in the ink composition at a concentration in the range of preferably 0.1 to 50 mass %, more preferably 0.5 to 40 mass %. At the content of lower than 0.1 mass %, the function of the aqueous solvent tends to be insufficiently exhibited, whereas, at the content of higher than 50 mass %, the viscosity tends to be excessively high.

The content of the block polymer in the polymer-containing composition of the present invention is in the range of preferably 0.1 to 50 mass %, more preferably 0.5 to 30 mass %. At the content lower than 0.1 mass % of the block polymer, the dispersibility of the particulate substance in the composition of the present invention tend to be insufficient, whereas at the content higher than 50 mass %, the viscosity tends to be excessively high.

The above ink composition can be responsive to stimulation. Owing to the responsiveness, the ink viscosity or other property can be changed by stimulation in an image-forming process to improve the fixability. The stimulation is selected from change of temperature, exposure to magnetic wave, change of pH, change of concentration, and so forth suitably for image formation.

The present invention is particularly suitable for the ink composition which changes the property in response to the stimulation. The pigment ink of the present invention, in which the pigment is highly dispersible, is improved to cause less ink-running and less feathering, and is excellent in fixability and smearing resistance. Thereby the ink composition as the pigment dispersion ink material of the present invention is useful as an image-forming material for high image quality, and high-speed image formation with low energy consumption.

The polymer-containing composition of the present invention changes its state (property) in response to stimulation. In the present invention, the "stimulation" includes change of temperature; application of electric field; exposure to light (electromagnetic wave) like ultraviolet ray, visible light, or infrared light; change of pH of the composition; addition of a chemical substance; and concentration change of the composition.

The preferred stimulation in the present invention is specifically shown below.

A first kind of the stimulation is change of the temperature around the phase transition temperature of the composition. A second kind of the stimulation is exposure to magnetic wave, preferably in the wavelength range of the electromagnetic wave from 100 to 800 nm. A third kind of the stimulation is pH change of the composition, preferably in the range from pH 3 to pH 12. A fourth kind of the stimulation is change of the concentration, including change of the concentration of the polymer dissolved in the composition by evaporation or absorption of the solvent from the composition. The concentration change is preferably caused around the phase transition concentration of the composition. Two of more kinds of the above stimulation may be applied in combination.

An additive, an auxiliary agent, or the like may be incorporated, as necessary, into the ink composition of the present invention. An example of the additive for the ink composition is a dispersion stabilizer for dispersing the pigment in the solvent. Although the block polymer in the ink composition of the present invention has capability of dispersing a particulate solid matter like the pigment, an additional dispersion stabilizer may be added to improve further the dispersion state. The additional dispersion stabilizer may be a resin having both a hydrophilic portion and a hydrophobic portion, or a surfactant.

The resin having a hydrophilic portion and a hydrophobic portion includes copolymers of a hydrophilic monomer and a hydrophobic monomer. The hydrophilic monomer includes acrylic acid, methacrylic acid, maleic acid, fumaric acid, monoesters of the aforementioned carboxylic acids, vinyl sulfonic acid, styrenesulfonic acid, vinyl alcohol, acrylamide, and methacryloxyethyl phosphate. The hydrophobic monomer includes styrene, styrene derivatives such as α-methylstyrene, vinylcyclohexane, vinylnaphthalene derivatives, acrylic esters, and methacrylic esters. The copolymer may be of various structures including random copolymers, block copolymers, and graft copolymers. Naturally, the hydrophilic monomers and the hydrophobic monomers are not limited to the ones mentioned above.

The surfactant includes anionic surfactants, nonionic surfactants, cationic surfactants, and amphoteric surfactants.

The anionic surfactant includes fatty acid salts, alkylsulfate salts, alkylarylsulfonate salts, alkyldiaryl ether disulfonate salts, dialkyl sulfosuccinate salts, alkylphosphate salts, naphthalenesulfonic acid-formaldehyde condensates, polyoxyethylenealkyl phosphate salts, glycerol borate, and fatty acid esters.

The nonionic surfactant includes polyoxyethylene alkyl ether, polyoxyethylene-oxypropylene block copolymer, sorbitan fatty acid ester, glycerin fatty acid ester, polyoxyethylene fatty acid ester, polyoxyethylenealkylamine, fluorine type surfactants, and silicone type surfactants.

The cationic surfactant includes alkylamine salts, quaternary ammonium salts, alkylpyridinium salts, and alkylimidazolium salts.

The amphoteric surfactant includes alkylbetaine, alkylamine oxide, and phosphatidyl choline. The surfactants are not limited to the ones mentioned above.

The additive which may be incorporated into the ink composition of the present invention includes acid-generating agents, polymerization initiators and crosslinking agents which can be activated by heat or electromagnetic wave.

Other additives which may be incorporated into the ink composition in the present invention include pH-adjusting agents for stabilization of the ink and stability of the ink in the ink pipe; penetrating agents for accelerating the ink penetration into the recording medium and facilitating apparent drying; fungicides for preventing growth of fungi; chelating agent for blocking metal ions to prevent deposition of a metal in the nozzle and deposition of an insoluble matter in the ink; antifoaming agent for preventing foam formation in circulation, transfer, or production of the recording liquid;

antioxidants; viscosity-adjusting agents; electric conducting agents, UV-absorbing agents; and coloring agents such as water-soluble dyes, dispersion dyes and oil-soluble dyes.

The ink composition of the present invention is preferably used as an ink for ink-jet recording. A method for preparing the ink for ink-jet recording is explained below.

(Method for Preparation of Ink for Ink-Jet)

In a example of preparing the ink composition for ink-jet recording of the present invention, a pigment, a block polymer of the present invention, and an additive are added to deionized water, and are dispersed by a dispersing machine; coarse particles are eliminated therefrom by centrifugation or a like method; and thereto water or a solvent and an additive are added and the mixture is stirred for complete mixing, and is filtered.

The dispersing machine includes ultrasonic homogenizers, laboratory homogenizers, colloid mills, jet mills, and ball mills. The machines may be used singly or in combination.

A composition employing a self-dispersible pigment can be prepared in the same manner as above.

Next, the image-forming method of the present invention is explained below.

(Image-Forming Method)

The ink composition of the present invention is useful for image formation by various image-forming methods such as printing, ink-jet recording, and electrophotography, being especially suitable for ink-jet recording.

The ink-jet recording may be conducted by any known ink-jet method including piezo ink-jet methods using a piezo element, thermal ink-jet method utilizing bubbling by thermal energy. The ink-jet method may be conducted by a continuous system or by an on-demand system. Further, the ink composition of the present invention may be used for transfer recording method in which an image is printed on an intermediate transfer medium with the ink and the formed image is transferred onto a final recording medium such as a paper sheet.

The stimulation-responsive ink-jet composition of the present invention can be used as an ink-jet recording ink in the modes by stimulation (a) to (d) as shown below.

(a) Ink Responsive to Temperature Stimulation:

A temperature difference between the ink in the ink tank and the ink deposited by ejection on a recording medium gives a temperature stimulation to cause phase change of the ink composition for ink-jet recording, resulting in quick viscosity increase of the composition or aggregation of the insoluble component.

(b) Ink Responsive to Electromagnetic Stimulation:

Exposure of the ink composition having been stored in a dark ink tank to visible light by ejection, or irradiation of electromagnetic wave from an electromagnetic wave irradiation unit gives an electromagnetic stimulation to cause polymerization of the polymerizable functional group contained in the ink composition for ink-jet recording of the present invention to cause viscosity increase or aggregation of an insoluble component.

(c) Ink Responsive to pH Change Stimulation:

Deposition onto the recording medium causes pH change of the ink composition by the influence of the recording medium, the pH change resulting in viscosity increase or aggregation of an insoluble component.

(d) Ink Responsive to Concentration Change Stimulation:

Evaporation of water or an aqueous solvent from the ejected ink composition or absorption thereof by the recording medium causes concentration change in the ink composition to give phase change, resulting in viscosity increase or aggregation of an insoluble component.

The change of the properties of the ink composition enables retardation of color running or feathering to obtain high ink fixability. Incidentally, the property change is not limited to the viscosity increase or the aggregation of the insoluble component.

The stimulation can be given in various methods. In a preferred method, a stimulating substance for the intended stimulation is mixed with or brought into contact with the stimulation-responsive ink composition. For example, to the pH-responsive ink mentioned in the above item (c), a corresponding pH-stimulating substance is mixed by ink-jet method. By the ink-jet method, the stimulating substance may be dotted by an ink-jet head over the entire area of image formation as disclosed in Japanese Patent Application Laid-Open No. 64-63185, or the quality of the formed image can be improved by controlling the amount of the stimulating substance as disclosed in Japanese Patent Laid-Open No. 8-216392.

Otherwise, one of the compositions containing the dye or pigment can be utilized as the stimulating substance. For example, in a color ink-jet recording, a stimulating ink is used as one of the inks of cyan, magenta, yellow, and black (CMYK), and a stimulation-responsive ink is used as another one of CMYK inks to retard color running. Various combinations of the stimulation-responsive ink and the stimulating ink are possible from among the inks of CMYK, but the selection of the combination is not limited in the present invention. Furthermore, the kind of the stimulating substance and the kind of the stimulation-responsive ink composition may be selected from all of the aforementioned stimulation response patterns, and is not limited specially.

The image-forming apparatus of the present invention is explained below.

(Image Recording Apparatus)

The ink composition of the present invention is useful in image-forming apparatuses utilizing an image-forming method such as printing methods, ink-jet method, and electrophotography, useful particularly in ink-jet recording apparatus.

The ink-jet recording apparatus employing the ink for ink-jet recording includes apparatuses of piezo ink-jet systems employing a piezo element, and apparatuses of thermal ink-jet systems utilizing a thermal energy for ink ejection by bubbling.

FIG. 1 shows schematically the system 20 of the image-forming apparatus of the present invention. The numeral 50 indicates a central processing unit (CPU). The program for controlling CPU 50 may be stored in program memory 66, or may be stored in storage means like EEPROM (not shown in the drawing) as a so-called firmwear. The ink-jet recording apparatus receives recording data from a recording data-forming means (a computer or the like, not shown in the drawing) and stores the data by program memory 66. The recorded data may be image information or character information itself to be recorded, or may be compressed information, or coded information. The compressed or coded information to be treated is expanded or depressed by CPU 50 to obtain the image or character information to be recorded. X-encoder 62 (e.g., for X direction or for the main scanning direction) and Y-encoder 64 (e.g., for Y direction or the auxiliary scanning direction) are provided to communicate the position of the head relative to the recording medium to CPU 50.

CPU 50 transmits signals for image recording to X-direction driving circuit 52, Y-direction driving circuit 54, and head-driving circuit 60 according to the information from program memory 66, X encoder 62, and Y encoder 64. X-direction driving circuit 52 drives X-direction driving motor 56, and Y-direction driving circuit 54 drives Y-direction driving motor 58 to move head 70 relatively to the recording medium to the recording position. At the moment when head 70 has come to the recording position, head-driving circuit 60 transmits signals for ejecting the ink composition (Y, M, C, or K) or a stimulating substance to head 70 to conduct recording. The head 70 may be the one for ejecting a single color ink composition, or the one for ejecting plural ink compositions, or may have additionally a function of ejecting a stimulating substance.

The ink composition of the present invention may be used in a direct recording system which ejects the ink directly onto a recording medium, or in a transfer recording system in which an ink image is formed on an intermediate transfer member having a latent image and the image is transferred onto a final recording medium such as a paper sheet. Otherwise, the ink composition of the present invention may be used in an apparatus of direct recording system utilizing intermediate transfer member.

The recording medium of the present invention is described below.

(Recording Medium)

The stimulation mechanism may be provided on a recording medium to stimulate the stimulation-responsive ink composition of the present invention.

In the image formation, as described above, the stimulating substance may be mixed with or brought into contact with the stimulation-responsive ink composition. Otherwise a stimulating mechanism may be provided on the recording medium preliminarily. For example, (1) an acid-responsive ink composition is used as the pH-responsive ink composition, and recording is conducted on an acidic paper sheet; (2) a pH-responsive ink composition is used as the stimulation-responsive ink composition, and recording is conducted on a recording medium which releases a pH-changing substance by application of heat, electromagnetic wave, or pressure; and (3) a stimulation-responsive ink containing a crosslinkable or polymerizable functional group is used as the ink composition, and recording is conducted on a recording medium which releases a pH-changing substance by application of heat, electromagnetic wave, or pressure. The recording medium in the present invention may be of any known kind, including plain paper sheets, thermosensitive paper sheets, and acidic paper sheets.

In the recording by the direct recording system, the above recording medium is used as the final recording medium. In the recording by the indirect recording system, the above recording medium may be employed as an intermediate transfer member, or as the final recording medium.

As described above and the following examples, the present invention provides a composition containing a particulate substance dispersed well in a solvent, and a block polymer having an ionic functional group.

The present invention provides also a functional composition which is an aqueous uniform dispersion.

The present invention provides further an ink composition containing a pigment as the particulate substance, water as the solvent, in which the pigment is dispersed with high dispersibility.

The present invention provide further a pigment-dispersion ink composition for ink-jet recording, which contains a particulate pigment material dispersed with high dispersion stability in the solvent, and which forms an image with high fixability and high smearing resistance.

The present invention provides still further an image-forming method employing the above pigment-dispersion ink composition for ink-jet recording, and an image-forming apparatus for the image-forming method.

EXAMPLES

The present invention is explained below in more detail without limiting the invention thereto. In the examples below, are explained a method of synthesis of a block polymer having an ionic functional group of the present invention, and a pigment dispersion-ink composition as an aqueous dispersion. Incidentally, only few methods are shown in Examples of the polymer synthesis and pigment-dispersion ink, but the present invention is not limited thereto.

Example 1

(Synthesis of Block Polymer)

Synthesis of ABX Type Block Polymer Constituted of 2-Ethoxyethyl Vinyl Ether (EOVE), 2-Methoxyethyl Vinyl Ether (MOVE), and $HO(CH_2)_5COOH$:

Poly[EOVE(2-ethoxyethyl vinyl ether)-b-MOVE(methoxyethyl vinyl ether)]-$O(CH_2)_5COOH$ was synthesized through the following steps (here, b is a symbol denoting a block polymer).

A glass vessel having a three-way cock is purged with a nitrogen, and was heated 250° C. under a nitrogen atmosphere to remove adsorbed water. After returning the system to room temperature, thereto were added 12 mmol of EOVE, 16 mmol of ethyl acetate, 0.1 mmol of 1-isobutoxyethyl acetate, and 11 mL of toluene. The reaction system was cooled. When the temperature of the system reached 0° C., 0.2 mmol of ethylaluminum sesquichloride (equimolar mixture of diethyaluminum chloride and ethylaluminum dichloride) to initiate polymerization. The molecular weight was monitored intermittently by molecular sieve column chromatography (GPC). Thereby the completion of polymerization of A component (EOVE) was confirmed.

Thereto, 12 mmol of the B component (MOVE) was added, and was allowed to polymerize. After the completion of polymerization of the B component was confirmed by GPC monitoring, 30 mmol of $HO(CH_2)_5COOEt$ was added thereto to stop the polymerization reaction. The reaction mixture solution was diluted with dichloromethane, and the diluted mixture was washed three times with 0.6M hydrochloric acid, and three times with distilled water. The organic phase after washing was evaporated to dryness to obtain a block polymer of poly[EOVE-b-MOVE]-$O(CH_2)_5COOEt$.

The synthesized compound was identified by GPC and NMR. In particular, the moiety bonding to the terminal was identified by a DOSY method of NMR, thereby the presence of a terminal portion being confirmed. The obtained polymer had Mn of $2.1 \times 10^4$, and Mw/Mn of 1.4 (Mn denotes a number-average molecular weight, and Mw denotes a weight-average molecular weight).

The terminal ester moiety of the obtained poly[EOVE-b-MOVE]-$O(CH_2)_5COOEt$ was hydrolyzed. The hydrolysis product was identified by NMR, and was found to be poly[EOVE-b-MOVE]-$O(CH_2)_5COOH$, an intended ABX type block polymer.

Example 2

A polymer compound, an isobutyl vinyl ether polymer having a —O—(CH$_2$)$_5$COOH group at the terminal, was synthesized in the same manner as in Example 1, using 3 mmol of isobutyl vinyl ether as a monomer. The polymer compound had a number-average molecular weight of 6,000, and a molecular weight distribution Mw/Mn of 1.11.

Example 3

A portion of 26 parts by weight of the block polymer having a carboxylic acid terminal obtained in Example 1 was stirred with 200 parts by weight of an aqueous sodium hydroxide solution of pH 11 for three days to obtain a sodium salt of polymer-carboxylic acid.

A portion of 25 weight parts of this solution was mixed with 10 weight parts of diethylene glycol, 5 weight parts of 2-pyrrolidone, 3 weight parts of carbon black (trade name: MOGUL-L, Cabot Co.), and 57 parts by weight of deionized water, and stirred by a homogenizer. From the resulting mixture, coarse particles were eliminated by filtration to obtain a pigment dispersion ink composition.

On contact of this ink composition with a 5 mass % polymethacrylic acid solution adjusted to pH 2, black gel was formed instantaneously, showing the stimulation-responsiveness of the ink composition.

The ink composition, on cooling to 10° C., became viscous apparently. This means presumably that the A block segment of the used block polymer, namely the EOVE block, changes to be hydrophilic to result in complete dissolution in a molecular state of the block polymer.

Example 4

The polymethacrylic acid solution of pH 2 described in Example 3 was sprayed preliminarily on a plain paper sheet. On this paper sheet, recording was conducted by ejecting the ink prepared in Example 3 from a printing head of an ink-jet printer (trade name: BJF800, Canon Inc.).

One minute later, for evaluation of fixation of the ink, another untreated plain paper sheet was pressed against the printed paper sheet at a load of $4.9 \times 10^4$ N/m$^2$. The fixation strength was evaluated by occurrence or nonoccurrence of transfer of the ink onto the untreated plain paper sheet. As the result, the transfer of the ink was not observed. This test was repeated five times to obtain invariably the same result.

Example 5

Recording was conducted in the same manner as in Example 4 except that an untreated plain paper was used as the recording medium and the area of the paper sheet to be dotted with the ejected ink was cooled to 10° C. in the ink-jet printer. The fixation strength test was conducted five times. In the two of the five repetitions of the test, black color was observed to be slightly transferred.

Comparative Example 1

An ink composition was prepared by mixing 5 mass parts of a self-dispersible pigment (trade name CAB-0-JET300, Cabot Co.), 0.5 mass parts of a surfactant (Nonion E-230, Nihon Yushi K.K.), 5 mass parts of ethylene glycol, and 89.5 mass parts of deionized water. The recording test and fixation test was conducted in the same manner as in Example 4. As the result, the ink transfer to the untreated plain paper was observed.

What is claimed is:

1. A block polymer containing segments of A, B, and Y, where A and B are block segments having a vinyl ether structure as the repeating unit, and Y is a terminal segment represented by the following General Formula (4):

-L'-M'-Z' (4)

in the formula, L' is a coupling group for coupling with the terminal of a block polymer selected from the group consisting of a single bond, —O—, —COO—, —OCO—, —CONH— and —NHCO—; M' is a substituted or unsubstituted linear or branched alkylene group of 2–30 carbons; and Z' represents a substituent selected from the group consisting of —COOH, a carboxylic ester group, —COO$^-$, —SO$_3$H, a sulfonic ester group, —SO$_3^-$, —OPO$_3$H$_2$, a phosphoric ester group, —OPO$_3$H$^-$, —OPO$_3^{2-}$, an amino group, and an acid salt of an amino group.

* * * * *

UNITED STATES PATENT AND TRADEMARK OFFICE
CERTIFICATE OF CORRECTION

| | |
|---|---|
| PATENT NO. | : 7,037,996 B2 |
| APPLICATION NO. | : 10/384334 |
| DATED | : May 2, 2006 |
| INVENTOR(S) | : Ikegami et al. |

It is certified that error appears in the above-identified patent and that said Letters Patent is hereby corrected as shown below:

In column 10, line 63 "$SO_2CH_3$" should read:

-- $SO_3CH_3$ --

In column 14, line 8 "of" should read:

-- or --

Signed and Sealed this

Fifteenth Day of August, 2006

JON W. DUDAS
*Director of the United States Patent and Trademark Office*